United States Patent
Fasano et al.

(10) Patent No.: US 11,536,327 B2
(45) Date of Patent: Dec. 27, 2022

(54) HYDRAULIC CONTROL SYSTEM

(71) Applicant: Dana Motion Systems Italia S.R.L., Reggio Emilia (IT)

(72) Inventors: Stefano Fasano, Reggio Emilia (IT); Daniele Dodi, Sant'Ilario d'Enza (IT)

(73) Assignee: Dana Motion Systems Italia S.R.L, Reggio Emilia (IT)

(*) Notice: Subject to any disclaimer, the term of this patent is extended or adjusted under 35 U.S.C. 154(b) by 0 days.

(21) Appl. No.: 17/364,709

(22) Filed: Jun. 30, 2021

(65) Prior Publication Data

US 2022/0003278 A1    Jan. 6, 2022

(30) Foreign Application Priority Data

Jul. 1, 2020   (DE) .................. 10 2020 208 262.6

(51) Int. Cl.
    *F16D 48/02*  (2006.01)
(52) U.S. Cl.
    CPC .. *F16D 48/0206* (2013.01); *F16D 2048/0221* (2013.01); *F16D 2048/0266* (2013.01)
(58) Field of Classification Search
    CPC ......... F16D 48/0206; F16D 2048/0221; F16D 2048/0266; F16D 2048/0209; F16D 2048/0245; F16D 2048/0263; F16D 2048/0278; F16H 61/0206; F16H 61/0251; F16H 61/2807; F16H 61/065
    See application file for complete search history.

(56) References Cited

U.S. PATENT DOCUMENTS

| | | | | |
|---|---|---|---|---|
| 4,349,094 A | * | 9/1982 | Pavesi | F16D 48/04 137/101 |
| 2008/0190729 A1 | * | 8/2008 | Stehr | F16D 48/062 192/48.601 |
| 2020/0378492 A1 | * | 12/2020 | Van Druten | F16H 61/0031 |
| 2021/0324921 A1 | * | 10/2021 | Kubo | F16D 25/10 |

FOREIGN PATENT DOCUMENTS

| | | | | |
|---|---|---|---|---|
| DE | 3833622 A1 | * | 4/1990 | |
| DE | 102006003517 A1 | * | 7/2007 | ......... F16D 48/0206 |
| DE | 102013207763 A1 | * | 10/2014 | ............. F15B 7/003 |
| DE | 102015219872 A1 | * | 4/2017 | |

* cited by examiner

*Primary Examiner* — Timothy Hannon
(74) *Attorney, Agent, or Firm* — McCoy Russell LLP

(57) ABSTRACT

The present disclosure describes a hydraulic control system comprising a first pressure chamber and a second pressure chamber, each pressure chamber configured to receive a hydraulic fluid, a first movable member configured to assume a position depending on a hydraulic pressure of the hydraulic fluid in the first pressure chamber and a second movable member configured to assume a position depending on a hydraulic pressure of the hydraulic fluid in the second pressure chamber, a hydraulic command circuit configured to provide the hydraulic fluid and to control the hydraulic pressure of the hydraulic fluid in the first pressure chamber and/or the second pressure chamber, having a switchable valve in fluid communication with the first pressure chamber, wherein the switchable valve is configured to be pilotable depending on the hydraulic pressure of the hydraulic fluid in the second pressure chamber.

19 Claims, 4 Drawing Sheets

HYDRAULIC CONTROL SYSTEM

CROSS-REFERENCE TO RELATED APPLICATION

The present application claims priority to German Patent Application Serial No. 10 2020 208 262.6, entitled "HYDRAULIC CONTROL SYSTEM," and filed on Jul. 1, 2020. The entire contents of the above-listed application are hereby incorporated by reference for all purposes.

TECHNICAL FIELD

The present disclosure relates to a hydraulic control system and a method of operating a hydraulic control system. The disclosure also relates to the use of a hydraulic control system.

BACKGROUND AND SUMMARY

The hydraulic control system is a device that uses a hydraulic fluid, like mineral oil, under a hydraulic pressure to control further devices, for example a hydraulic machine that uses a hydraulic fluid under pressure to perform work. Further devices may also be actuators like a steering box assembly, a brake assembly or a clutch assembly that may, for example, allow or interrupt a transmission of power in a drive train. The advantage of the hydraulic control system is its capacity to create a large force with small technical effort and relatively little energy consumption. A first member of the hydraulic control system may be in fluid communication with a second member of the hydraulic control system. That is, a fluid, for example the hydraulic fluid, may flow from the first member to the second member of the hydraulic control system and reverse. It may also be that a pressure in the fluid, for example a hydraulic pressure, propagates from the first member to the second member being in fluid communication and reverse. A fluid communication may, for example, be implemented with a hydraulic pipe.

The hydraulic control system may be applied, but not limited, to the control of a two gears transmission comprising a first gear and a second gear. Such a transmission may, for example, be used in a machine, for example within a construction machine, where large forces are needed and the speed is usually relatively low in comparison to a commonly used passenger vehicle.

A clutch may connect at least two parts of a drive train, for example by bringing the two parts in a physical contact. This may be achieved by moving at least one part of the clutch relative to the other part. To establish the physical contact the coupling may comprise a first clutch disc and a second clutch disc wherein the physical contact is established by bringing the first clutch disc and the second clutch disc into a frictional engagement.

The two gears transmission may have a first clutch and a second clutch. Both may be hydraulically controlled, that is, by using the hydraulic fluid under the hydraulic pressure. When the first clutch, connected with the first gear of the transmission, is supplied with a hydraulic fluid being pressurized, the first clutch may open and the first gear may disengage. Vice versa, when the first clutch is connected to a tank receiving the hydraulic fluid, a return spring may bring the first clutch to closure and the first gear may engage. The working principle of the second clutch may be the same.

Typically, a closed clutch corresponds to the transmission of mechanical power from an input of a clutch to an output of a clutch. In that case both parts of the drive train may be in physical contact. An open clutch typically corresponds to no transmission of mechanical power from the input of the clutch to the output of the clutch. In that case both parts of the drive train may be not in physical contact. An opening of the clutch may be a a transition from the closed clutch to the open clutch. A closure of the clutch may be a transition from the open clutch to the closed clutch. The closed clutch may also be denoted as an engaged clutch. The opened clutch may also be denoted as a disengaged clutch. The closure of a clutch may be denoted as an engagement of the clutch or engaging the clutch. The opening of a clutch may be denoted as a disengagement of the clutch or disengaging the clutch.

A gear change may be understood, for example, as engaging the first gear and disengaging the second gear or disengaging the first gear and engaging the second gear, or disengaging both, the first gear and the second gear, or engaging the first gear and the second gear.

Typically, the opening and/or the closure of the first clutch and/or the second clutch during a gear change needs to be controlled in a coordinated manner to prevent a potential damage of the two gears transmission. Such damage may occur if both gears are engaged at the same time while power is transmitted with the drive train.

For example, the disengagement of the engaged clutch should be done before the engagement of the disengaged clutch, because the contemporary engagement of the two clutches is inconsistent with the movement of the machine. Moreover, in downshift from the second gear to the first gear, a too quick engagement of the first gear should be avoided to prevent stress to the components and give an uncomfortable knockback to the machine operator. When the transients rely only on an orifice and an accumulator, the transmission features may not be constant over time. This may be caused by the effect of the orifice depending strongly on a temperature, and by a wear of the clutch affecting a working pressure over time.

The hydraulic control system according to claim 1 and the method of operating a hydraulic control system according to an auxiliary claim may solve this problem and may hence be advantageously applied to prevent a damage of the two gears transmission. Advantageous designs and further developments of the present disclosure are to be deduced from the features of the dependent claims and the following description.

The hydraulic control system may comprise a first pressure chamber and a second pressure chamber, each pressure chamber configured to receive the hydraulic fluid. It may also have a first movable member configured to assume a position depending on a hydraulic pressure of the hydraulic fluid in the first pressure chamber and a second movable member configured to assume a position depending on a hydraulic pressure of the hydraulic fluid in the second pressure chamber. A pressure chamber may be defined as a closed space. It may be limited by one or more walls and the closed space may be filled with a medium, wherein the medium has a pressure and wherein the medium may exert a force on the one or more walls corresponding to the pressure. For example, the medium may be the hydraulic fluid having the hydraulic pressure. The first and/or the second movable member may be realised as a movable wall of the related pressure chamber, for example as a piston or spool. The first pressure chamber with the first movable member and the second pressure chamber with the second movable member may be considered as actuators operating a first and/or a second further member of the hydraulic control system. Such a further member may be, for example, a clutch, a steering assembly, a brake assembly, a robot arm, a switch or another mechanically controllable system.

The hydraulic control system may include a hydraulic command circuit configured to provide the hydraulic fluid and to control the hydraulic pressure of the hydraulic fluid in the first pressure chamber and/or the second pressure chamber. By controlling the hydraulic pressure of the hydraulic fluid in the first pressure chamber, the hydraulic command circuit may control the position of the first movable member. By controlling the hydraulic pressure of the hydraulic fluid in the second pressure chamber, the hydraulic command circuit may control the position of the second movable member.

The hydraulic control system may further comprise a switchable valve in fluid communication with the first pressure chamber, wherein the switchable valve is configured to be pilotable depending on the hydraulic pressure of the hydraulic fluid in the second pressure chamber. The switchable valve may allow, restrict and/or block a passage of the hydraulic fluid through the switchable valve and hence may affect a hydraulic connection between the first pressure chamber and other members of the hydraulic control system. By making the switchable valve pilotable by the hydraulic pressure of the hydraulic fluid in the second pressure chamber, it may be possible to establish a cooperation of the hydraulic pressure of the hydraulic fluid in the first pressure chamber and the hydraulic pressure of the hydraulic fluid in the second pressure chamber. This may be used to coordinate the position of the first movable member and the position of the second movable member.

The hydraulic control system may also comprise a first and a second clutch, wherein the first movable member may be connected to the first clutch and may be configured to engage and/or disengage the first clutch and wherein the second movable member may be connected to the second clutch and may be configured to engage and/or disengage the second clutch. Connecting the first clutch to the first movable member may allow for engaging/disengaging the first clutch hydraulically. In an embodiment it may be, for example, that a high hydraulic pressure in the first pressure chamber corresponds to a disengaged first clutch while a low hydraulic pressure in the first pressure chamber corresponds to an engaged first clutch. In another embodiment it may be the other way round. Connecting the second clutch to the second movable member may allow for engaging/disengaging the second clutch hydraulically. In an embodiment it may be, for example, that a high hydraulic pressure in the second pressure chamber corresponds to a disengaged second clutch while a low hydraulic pressure in the second pressure chamber corresponds to an engaged second clutch. In further embodiment it may be the other way round.

The hydraulic control system may further include a first hydraulic network configured to provide a fluid communication between the first pressure chamber and the hydraulic command circuit, the first hydraulic network may further comprise a first restricting orifice and the switchable valve connected in series and a first check valve connected in parallel to the first restricting orifice and the switchable valve.

The restricting orifice may restrict and hence may limit the flow of a medium, for example the hydraulic fluid. This may, for example, be achieved by reducing the inner diameter of a pipe or generally limiting the area through which the medium may flow.

The first check valve may provide a directed flow of the hydraulic fluid towards the first pressure chamber. It may block a directed flow of the hydraulic fluid from the first pressure chamber. Being in parallel to the switchable valve and the first restricting orifice the first check valve may provide a means for a passage of the hydraulic fluid to the first pressure chamber by bypassing the switchable valve and the first restricting orifice. Otherwise, a passage of the hydraulic fluid from the first pressure chamber may not be possible through the check valve but through the switchable valve and the first restricting orifice. In this case, the passage of the hydraulic fluid and the amount of the hydraulic fluid passing from and/or to the first pressure chamber may be controlled with the switchable valve and/or the first restricting orifice.

The first check valve and/or the first restricting orifice may have fixed characteristics or may have adjustable characteristics. For example, the first check valve may comprise as a characteristics a threshold value, wherein the first check valve allows the passage of hydraulic fluid only if the hydraulic pressure of the hydraulic fluid is greater than the threshold value. The threshold value may be adjustable and/or fixed to a predetermined threshold value. Furthermore, the characteristics of the first restricting orifice may be a level of restriction of the passage of the hydraulic fluid, for example by way of an adjustable level or a fixed level of restriction wherein the level of restriction may vary between a complete block and a free passage of the hydraulic fluid, wherein the complete block of the passage of the hydraulic fluid may be excluded.

The hydraulic control system may also have a second hydraulic network configured to provide a fluid communication between the second pressure chamber and the hydraulic command circuit, the second hydraulic network may further comprise a parallel circuit of a second check valve and a second restricting orifice.

The second check valve may provide a directed flow of the hydraulic fluid towards the second pressure chamber. It may block a directed flow of the hydraulic fluid from the second pressure chamber. Being in parallel to the second restricting orifice the second check valve may provide a means for a passage of the hydraulic fluid to the second pressure chamber by bypassing the second restricting orifice. Otherwise, a passage of the hydraulic fluid from the second pressure chamber may not be possible through the check valve but through the second restricting orifice. In this case, the passage of the hydraulic fluid and the amount of the hydraulic fluid passing from and/or to the second pressure chamber may be controlled with the second restricting orifice.

The second check valve and/or the second restricting orifice may have fixed characteristics or may have adjustable characteristics. For example, the second check valve may comprise as a characteristics a threshold value, wherein the second check valve allows the passage of the hydraulic fluid only if the hydraulic pressure of the hydraulic fluid is greater than the threshold value. The threshold value may be adjustable and/or fixed to a predetermined threshold value. Furthermore, the characteristics of the second restricting orifice may be a level of restriction of the passage of the hydraulic fluid, for example by way of an adjustable level or a fixed level of restriction wherein the level of restriction may vary between a complete block and a free passage of the hydraulic fluid, wherein the complete block of the passage of the hydraulic fluid may be excluded.

The characteristics of the first check valve may be different from the characteristics of the second check valve. The characteristics of the first restricting orifice may be different from the characteristics of the second restricting orifice.

It is possible, that the hydraulic command circuit comprises a hydraulic tank configured to store the hydraulic fluid, a hydraulic pump configured to pump the hydraulic fluid and to create the hydraulic pressure, and a controllable valve configured to block and/or allow passage of the hydraulic fluid and be in fluid communication with the hydraulic tank and/or the hydraulic pump and/or the first pressure chamber and/or the second pressure chamber.

The hydraulic tank may provide a reservoir for storing the hydraulic fluid and it may be possible to retrieve the hydraulic fluid from the hydraulic tank, for example using the hydraulic pump. It may also be possible to deposit the hydraulic fluid in the hydraulic tank, for example by passing the hydraulic fluid from the first pressure chamber to the hydraulic tank via the first hydraulic network and the hydraulic command circuit and/or by passing the hydraulic fluid from the second pressure chamber to the hydraulic tank via the second hydraulic network and the hydraulic command circuit. The controllable valve may provide a means to control the distribution of the hydraulic fluid and the hydraulic pressure in the hydraulic control system. With the controllable valve it may be possible to allow and/or to block a passage of the hydraulic fluid from the hydraulic pump to the first pressure chamber and/or the second pressure chamber via the first hydraulic network and/or the second hydraulic network, respectively. With the controllable valve it may also be possible to allow and/or to block a passage of the hydraulic fluid from the first pressure chamber and/or the second pressure chamber to the hydraulic tank via the first hydraulic network and/or the second hydraulic network, respectively. The controllable valve may be controllable and/or adjustable, for example by means of electromagnetic actuators like solenoids or other actuators like mechanical actuators, for example a switch, a lever or a setscrew.

In certain embodiments it is possible that the switchable valve is configured to, in a first state, allow a passage of the hydraulic fluid through the switchable valve to and/or from the first pressure chamber and, in a second state, restrict, for instance by means of an orifice and/or a notch, the passage of the hydraulic fluid through the switchable valve to and/or from the first pressure chamber or to block the passage of the hydraulic fluid through the switchable valve.

For example, in the first state it may be possible to reduce the amount of hydraulic fluid and hence the hydraulic pressure in the first pressure chamber. This may be achieved in cooperation with the controllable valve that may open a passage from the first hydraulic network to the hydraulic tank. For example, in the second state it may be possible to increase or maintain the amount of hydraulic fluid and hence to increase or to maintain the hydraulic pressure in the first pressure chamber. This may be achieved in cooperation with the controllable valve that may open a passage from the hydraulic pump to the first hydraulic network.

It may further be that the switchable valve is configured to be in the first state when the hydraulic pressure in the second pressure chamber is substantially greater than or equal to a threshold. In certain embodiments it may be that the threshold is adjustable or a fixed, for example a predetermined, threshold. Since the state of the switchable valve corresponds to the free, restricted or blocked passage of hydraulic fluid through the switchable valve it is possible to, at least partially, control the hydraulic pressure in the first pressure chamber with the hydraulic pressure in the second pressure chamber and/or with adjusting the threshold or fixing the threshold value, for example to a predetermined value. The hydraulic pressure in the first pressure chamber may only be decreased if the hydraulic pressure in the second pressure chamber is greater than the threshold. Since the hydraulic pressure in the first pressure chamber corresponds to the engagement/disengagement of the first clutch and the hydraulic pressure in the second pressure chamber corresponds to the engagement/disengagement of the second clutch, it is possible to coordinate the engagement/disengagement of both clutches in a coordinated manner. For example, the first clutch may only engage if the second clutch is already disengaged. Or, the second clutch may only engage if the first clutch is already disengaged.

In an embodiment it is possible that the switchable valve comprises a spool and a spring configured to apply a force to the spool and wherein the threshold corresponds to the magnitude of the force applied to the spool. The spring may exert a force on the spool corresponding to its spring constant. The spool may be movable within the switchable valve such that a first position of the spool corresponds to the first state of the switchable valve and a second position of the spool corresponds to the second state of the switchable valve. If, at the same time, a force corresponding to the hydraulic pressure in the second pressure chamber acts on the spool as well, both forces affect the position assumed by the spool and hence the state of the switchable valve. It is hence possible to choose the spring force such that the spool is in a position corresponding to the first state only when the force corresponding to the hydraulic pressure in the second pressure chamber is greater than the threshold corresponding to the spring force. The force corresponding to the hydraulic pressure in the second pressure chamber may be applied by connecting the switchable valve to the second hydraulic network such that the hydraulic pressure within the second pressure chamber can directly act on the spool of the switchable valve. In addition to the spring force there may be further additional forces acting on the spool, such as a further hydraulic force, for example corresponding to a hydraulic pressure in the first hydraulic network. Further additional forces acting on the spool may also be provided by a solenoid actuator, a permanent magnet assembly or any other actuator.

In another embodiment, the threshold may correspond to either the hydraulic pressure in the first hydraulic network or in the second hydraulic network, whichever pressure is the highest. The switchable valve may be fluidly connected to the second hydraulic network and may be fluidly connected to a hydraulic pipe in which the hydraulic fluid has a hydraulic pressure corresponding to either the hydraulic pressure in the first hydraulic network or in the second hydraulic network, whichever pressure is the highest. The switchable valve may have a movable member, such as a spool. A first position of the movable member may correspond to the first state of the valve and a second position of the movable member may correspond to the second state of the valve. It may further be that a force corresponding to the hydraulic pressure in the second hydraulic network acts on the movable member, and, for example in the opposite direction, a force corresponding to the hydraulic pressure in the hydraulic pipe acts on the movable member. Both forces determine which position is assumed by the movable member and hence the state of the switchable valve. The hydraulic pressure in the hydraulic pipe hence corresponds to the threshold.

The hydraulic control system may also comprise a shuttle valve in fluid communication with the first hydraulic network and the second hydraulic network and the switchable valve, wherein the shuttle valve is configured to provide the hydraulic fluid to the switchable valve having the hydraulic pressure corresponding to either the hydraulic pressure in the first hydraulic network or in the second hydraulic network, whichever pressure is the highest. The shuttle valve serves as a means to determine which hydraulic pressure is higher, the hydraulic pressure of the first hydraulic network or the hydraulic pressure of the second hydraulic network. The result, that is the highest hydraulic pressure, is provided as a hydraulic pressure of the hydraulic fluid to the switchable valve.

There may also be other ways to provide a highest hydraulic pressure of two hydraulic pressures or a force corresponding to the highest hydraulic pressure of two hydraulic pressures to the switchable valve. For example, it is possible to determine a hydraulic pressure by one or more pressure sensors. Two hydraulic pressures captured by the one or more pressure sensors may be compared using an analogue electronic circuit, for example including an operational amplifier acting as a comparator. The captured hydraulic pressures may also be converted into a digital domain and compared using a digital electronic circuit, for example a microcontroller or a control unit. The result of the comparison may be used for controlling a hydraulic actuator, for example including a solenoid valve, and opening and/or closing a hydraulic connection between the first hydraulic network and/or the second hydraulic network and the switchable valve. The result of the comparison may, for example, also be used to control the position of the spool of the switchable valve by means of a solenoid actuator. It may be that the solenoid actuator is controlled by the microcontroller or the control unit.

In an embodiment it is also possible that the hydraulic control system comprises a first connecting hydraulic pipe connecting the switchable valve and the first restricting orifice and a second connecting hydraulic pipe connecting the second restricting orifice and the hydraulic command circuit, wherein the shuttle valve is in fluid communication with the first connecting hydraulic pipe and the second connecting hydraulic pipe.

It may also be that the hydraulic control system comprises a control unit configured to control the hydraulic command circuit, for instance configured to control a passage of the hydraulic fluid through a controllable valve.

The control unit may control the hydraulic pump, for example, to create the hydraulic pressure to exert a force on the first movable member of the first pressure chamber and/or the second movable member of the second pressure chamber sufficient to move the first movable member of the first pressure chamber and/or the second movable member of the second pressure chamber. The force corresponding to the hydraulic pressure may be sufficient if it is at least greater than a first restoring force acting on the movable member of the first pressure chamber and/or a second restoring force acting on the movable member of the second pressure chamber. The first restoring force may be provided by a first return spring in the first pressure chamber and the second restoring force may be provided by a second return spring in the second pressure chamber. There may be other ways to create a restoring force, such as, for example, be means of a solenoid actuator, a permanent magnet assembly or an electrical motor. A restoring force may also be created by a further hydraulic assembly.

A hydraulic pump may be realised, for example, with a positive displacement pump such as a roller-cell pump, an internal-gear pump or a screw-spindle pump. It may also by realised by a flow-type pump and/or a high pressure pump.

The control unit may control the controllable valve. Controlling may include providing and/or blocking a hydraulic connection between an input of the controllable valve and an output of the controllable valve. It may be that the controllable valve includes a solenoid actuator such that the control unit may control the controllable valve electrically by controlling the solenoid actuator. The controllable valve may also have a spring or another device that may produce a restoring force, for example a permanent magnet assembly. The restoring force may lead to a softer operation of the controllable valve, for example to reduce wear or improve a usability and/or a perception of an operator. The control unit may also control other members of the hydraulic control system, for example the switchable valve which may then have a solenoid.

The control unit may be an electronic and/or electric device, for example a microcontroller. It may include a memory, a processing unit, a control interface and an interface to receive and/or transmit information. It may also comprise an interface to operate the control unit, wherein the interface to operate the control unit may include means for input and means for output. The control unit may be connected to an input device, for example a sensor or an interface providing a means to be operated by an operator or another technical device, for example a computer. The input device may further comprise a lever, a gear stick, a touch pad, a keypad, a keyboard, a speech recognition and/or a communication interface. The communication interface may be wired or wireless. The sensor may comprise, for example, a position sensor, an acceleration sensor, a pressure sensor, a tactile sensor, a flow sensor, a level indicator. It may use different measurement principles, such as an optical, a magnetic, an eddy current, a hall, a piezo, an inductive and/or a capacitive. The control unit may include a software program or any other program that implements a method of operating the hydraulic control system.

A method to control a hydraulic control system may comprise controlling a hydraulic control system, wherein the control unit controls a passage of the hydraulic fluid through the controllable valve, wherein the method comprises a first operating mode to allow the passage of the hydraulic fluid and/or the propagation of the hydraulic pressure between the hydraulic pump and the second pressure chamber through the controllable valve and the passage of the hydraulic fluid between the first pressure chamber and the hydraulic tank through the controllable valve such that the first clutch is engaged and the second clutch is disengaged; and wherein the method comprises a second operating mode to allow the passage of the hydraulic fluid and/or a propagation of a hydraulic pressure between the hydraulic pump and the first pressure chamber through the controllable valve and the passage of the hydraulic fluid between the second pressure chamber and the hydraulic tank through the controllable valve such that the first clutch is disengaged and the second clutch is engaged; and wherein the method comprises a third mode to allow the passage of the hydraulic fluid between the first pressure chamber and the hydraulic tank through the controllable valve and between the second pressure chamber and the hydraulic tank through the controllable valve such that the first clutch is engaged and the second clutch is engaged.

The first operating mode may correspond to an operating of the hydraulic control system where the first gear is engaged. The second operating mode may correspond to an operating of the hydraulic control system where the second gear is engaged. The third operating mode may correspond to an operating of the hydraulic control system where the first gear and the second gear are engaged. The third operating mode may be active, for example, during stand still of the transmission and/or be indicative for a parking position.

The method may also include a step wherein, in the first operating mode, the switchable valve allows a free passage of the hydraulic fluid through the switchable valve to and/or from the first pressure chamber.

The method to control the hydraulic control system may include a step wherein, in the second operating mode, the switchable valve restricts, for instance by means of an orifice and/or a notch, the passage of the hydraulic fluid through the switchable valve to and/or from the first pressure chamber or blocks the passage of the hydraulic fluid through the switchable valve.

The method may further comprise a step wherein, in the third operating mode, the switchable valve restricts, for instance by means of an orifice and/or a notch, the passage of the hydraulic fluid through the switchable valve to and/or from the first pressure chamber or allows the free passage of the hydraulic fluid through the switchable valve.

The method to control the hydraulic control system may also include a step, wherein the first hydraulic network and the second hydraulic network and the hydraulic command circuit are adjusted to allow a free passage of the hydraulic fluid through the switchable valve to and/or from the first pressure chamber if the hydraulic pressure in the second pressure chamber is equal or larger than 60 percent of a predetermined maximum value, equal or larger than 70 percent of the maximum value, equal or larger than 80 percent of the maximum value, or equal or larger than 90 percent of the maximum value.

Adjusting the first hydraulic network and/or the second hydraulic network and/or the hydraulic command circuit may concern the maximum value and/or the percentage above which a free passage of the hydraulic fluid is allowable.

The maximum value may correspond to a maximum hydraulic pressure in the second pressure chamber. The maximum hydraulic pressure may be adjustable by adjusting the hydraulic pump creating the hydraulic pressure and/or adjusting the second return spring creating the second restoring force acting on the second movable element in the second pressure chamber. The second restoring force on the second movable element in the second pressure chamber may correspond to and may be adjustable by choosing a spring constant from a predetermined spring constant of the second return spring connected to the second movable member in the second pressure chamber. The maximum hydraulic pressure may also depend on the first restoring force acting on the first movable element in the first pressure chamber. The first restoring force on the first movable element in the first pressure chamber may correspond to and may be adjustable by choosing a spring constant from a predetermined spring constant of the first return spring connected to the first movable member in the first pressure chamber.

Adjusting the first hydraulic network and/or the second hydraulic network and/or the hydraulic command circuit may concern adjusting the force exerted by the spring on the spool of the switchable valve, for example by choosing among one or more predetermined spring constants or by adjusting a bias to the spring, for example by means of a setscrew. Furthermore, it is possible to adjust the switching valve behaviour by adjusting a size and an orientation of a surface area of the spool and/or a portion of the spool that contacts the hydraulic fluid.

Adjusting the first hydraulic network and/or the second hydraulic network and/or the hydraulic command circuit may concern adjusting the transient behaviour of the hydraulic control system and/or adjusting the engagement of the first clutch. It may concern adjusting the speed of the engagement and the change of torque transmitted through the first clutch and hence, for example, reduce the wear of the transmission and/or improve the operability of the hydraulic control system. It may also concern adjusting the engagement and/or disengagement of the first clutch in a timely relation to the engagement and/or disengagement of the second clutch. By this, it may be possible to prevent a potentially damaging situation where, for example, during the transmission of the torque, the first clutch and the second clutch are engaged at the same time. Adjusting the first hydraulic network and/or the second hydraulic network and/or the hydraulic command circuit may hence provide a time coordination between the engagement and/or disengagement of the first and the second clutch allowing for a safe operation of the hydraulic control system.

The hydraulic control system may be used in a transmission, for instance in a two gears transmission. The transmission may be installed in a vehicle, in a construction machine or in another machine employing a transmission.

BRIEF DESCRIPTION OF THE FIGURES

The present disclosure is described below with reference to certain embodiments and the accompanying drawings, in which.

DETAILED DESCRIPTION

Figure 1:
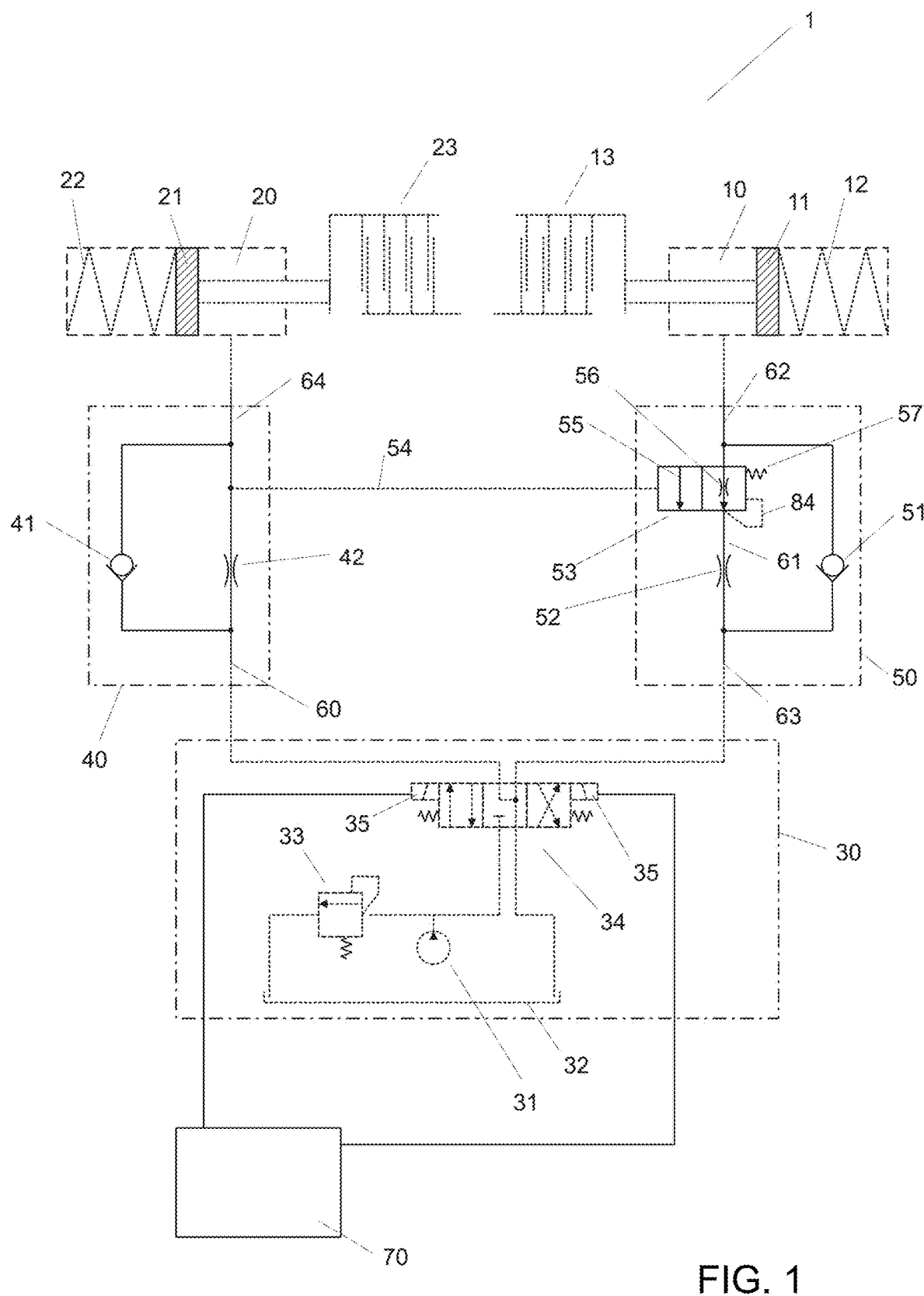
FIG. 1 shows an overview of the hydraulic control system in a first embodiment.

FIG. 1 gives an overview of the hydraulic control system 1 in a first embodiment. The hydraulic control system 1 includes a first clutch 13 and a second clutch 23 wherein the first clutch 13 may be connected to a first gear and the second clutch 23 may be connected to a second gear. The hydraulic control system further comprises a first pressure chamber 10 and a second pressure chamber 20, a first hydraulic network 50 and a second hydraulic network 40, a hydraulic command circuit 30 and a control unit 70.

The first pressure chamber 10 includes a first movable member 11 and a first return spring 12. The position of the first movable member 11 depends on a force exerted on the first movable member 11 by a hydraulic pressure of a hydraulic fluid in the first pressure chamber 10 and on a restoring force exerted on the first movable member 11 by the first return spring 12. The first movable member 11 is connected to the first clutch 13 and is configured to actuate the first clutch 13, that is, to engage and/or disengage the first clutch 13.

The second pressure chamber 20 includes a second movable member 21 and a second return spring 22. The position of the second movable member 21 depends on a force exerted on the second movable member 21 by a hydraulic pressure of the hydraulic fluid in the second pressure chamber 20 and on a restoring force exerted on the second movable member 21 by the second return spring 22. The second movable member 21 is connected to the second clutch 23 and is configured to actuate the second clutch 23, that is, to engage and/or disengage the second clutch 23.

The first hydraulic network 50 includes a switchable valve 53 and a restricting orifice 52 connected in series via a hydraulic pipe 61. The first hydraulic network 50 further includes a check valve 51 in parallel to the switchable valve 53 and the restricting orifice 52. The switchable valve 53 comprises a hydraulic aperture 54' (depicted in FIGS. 2 and 3, not depicted in FIG. 1) for receiving a hydraulic pipe 54 with the hydraulic fluid having a hydraulic pressure of the second pressure chamber 20. The switchable valve 53 further comprises a spring 57 exerting a restoring force on a spool 81 (depicted in FIGS. 2 and 3, not depicted in FIG. 1) and disposed in a spring chamber 85 (depicted in FIGS. 2 and 3, not depicted in FIG. 1), and a hydraulic connection 84 connecting the hydraulic pipe 61 and the spring chamber 85 hydraulically via a hydraulic aperture 61' (depicted in FIGS. 2 and 3, not depicted in FIG. 1) and wherein the hydraulic fluid in the hydraulic connection 84 and the spring chamber 85 has a hydraulic pressure of the hydraulic pipe 61.

The switchable valve 53 may assume a first state where the passage of the hydraulic fluid through the switchable valve is free along an unrestricted passage way 55 and a second state where the passage of the hydraulic fluid is restricted along a restricted passage way 56 which may be an embodiment of a restricting orifice. The switchable valve 53 may be controlled by the restoring force of the spring 57, the force corresponding to a hydraulic pressure in the hydraulic aperture 54' and the force corresponding to the hydraulic pressure in the internal hydraulic connection 84 and hence the hydraulic pressure in the spring chamber 85.

A hydraulic 63 pipe connects the restricting orifice 52 and the check valve 51 hydraulically with a controllable valve 34 disposed in the hydraulic command circuit 30. A hydraulic pipe 62 connects the switchable valve 53 and the check valve 51 hydraulically with the first pressure chamber 10. The check valve 51 has a directivity wherein the directivity only allows for a flow of the hydraulic fluid from the hydraulic command circuit 30 towards the first pressure chamber 10.

The second hydraulic network 40 includes a check valve 41 in parallel to a restricting orifice 42. A hydraulic 60 pipe connects the restricting orifice 42 and the check valve 41 hydraulically with the controllable valve 34 of the hydraulic command circuit 30.

A hydraulic pipe 64 connects the restricting orifice 42 and the check valve 41 hydraulically with the second pressure chamber 20. The check valve 41 has a directivity wherein the directivity only allows for a flow of the hydraulic fluid from the hydraulic command circuit 30 towards the second pressure chamber 20.

The hydraulic command circuit 30 comprises the controllable valve 34, wherein the controllable valve is controlled with a solenoid actuator 35. The hydraulic command circuit 30 further comprises a hydraulic pump 31, a hydraulic tank 32 and a pressure relief valve 33. The controllable valve 34 is controllable by a control unit 70 which is configured to control the solenoid actuator 35. The control unit 70 may be a microcontroller or another kind of computer which controls the controllable valve 34 according to a program which may be stored in a memory.

In an embodiment the hydraulic pump 31 may pump at a fixed pumping rate, wherein the pumping rate denotes a volume of hydraulic fluid per time unit. In another embodiment it may be that the hydraulic pump 31 is controlled by the control unit 70, for example in an open loop control mode or in a closed loop control mode, in order to achieve a fixed or a variable target pumping rate and/or a target hydraulic pressure. In a closed loop control there may also be a sensor, for example a pressure sensor or a flow sensor, included in the hydraulic control system 1. The target pumping rate and/or the target hydraulic pressure may be determined within the control unit 70 or may be commanded to the control unit 70 via an interface of the control unit 70.

The controllable valve 34 of the hydraulic command circuit 30 may be in fluid communication with the hydraulic tank 32 and/or with the hydraulic pump 31. The controllable valve 34 may be in fluid communication with the first hydraulic network 50 via the hydraulic pipe 63. The controllable valve 34 may be controlled to provide and/or block a hydraulic connection between the first hydraulic network 50 and the hydraulic pump 31 and/or the hydraulic tank 32.

The controllable valve 34 may be in fluid communication with the second hydraulic network 40 via the hydraulic pipe 60. The controllable valve 34 may be controlled to provide and/or block a hydraulic connection between the second hydraulic network 40 and the hydraulic pump 31 and/or the hydraulic tank 32.

The controllable valve 34 may also have a return spring exerting a restoring force on a movable member of the controllable valve 34.

The pressure relief valve 33 may be used to protect the hydraulic control system 1 against excessive hydraulic pressure values. In that case it may provide a hydraulic short-cut between hydraulic pump 31 and hydraulic tank 32.

Figure 2:
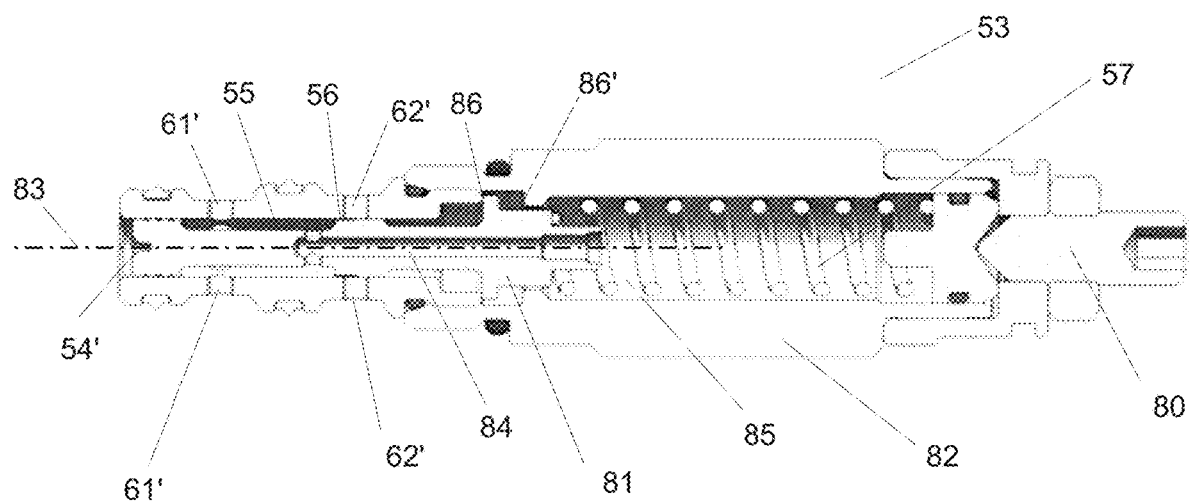
FIG. 2 shows a switchable valve in the first embodiment.

FIG. 2 depicts a switchable 53 valve in a first embodiment. It comprises a valve housing 82, a spool 81, a spring 57 and a setscrew 80 disposed within the valve housing 82. The spring 57 is configured to apply a restoring force on the spool 81. The setscrew 80 may be used to bias the restoring force of the spring 57. The switchable valve 53 includes a number of apertures 54', 61' and 62' configured as hydraulic connectors to receive the hydraulic pipes 54, 61 and 62, respectively. A bore 84 in the spool 81 connects the aperture 61' hydraulically with the spring chamber 85. The aperture 62' may be, for example, hydraulically connected to the first pressure chamber 10 and aperture 61' may be hydraulically connected to the restricting orifice 52. The aperture 54' may be connected to the second hydraulic network 40 such that the hydraulic pressure of the second hydraulic network 40, or the hydraulic pressure of the second pressure chamber 20, may be present within the aperture 54'. A force corresponding to the hydraulic pressure in the second pressure chamber 20 may then act on the spool 81 together with the restoring force of the spring 57. Both forces determine the position of the spool 81, wherein the position of the spool 81 corresponds to a state of the switchable valve 53. The movability of the spool 81 is limited by a first stop 86 and a second stop 86'. The switchable valve 53 may be in a first state if the spool 81 contacts the second stop 86'. It may be in a second state if the spool 81 contacts the first stop 86.

The spool 81 is designed to have different diameters along its central axis 83 such that, depending on the position of the spool 81, for example when the spool 81 contacts the second stop 86', there may be a hydraulic connection through the valve between the apertures 61' and 62' allowing for a free passage of the hydraulic fluid. It may also be, for example when the spool 81 contacts the first stop 86, that there is a hydraulic connection through the valve between the apertures 61' and 62' allowing for a restricted passage of the hydraulic fluid. The orifice 56 of the spool may be designed to adjust the restriction of the flow of the hydraulic fluid through the switchable valve 53.

Figure 3:
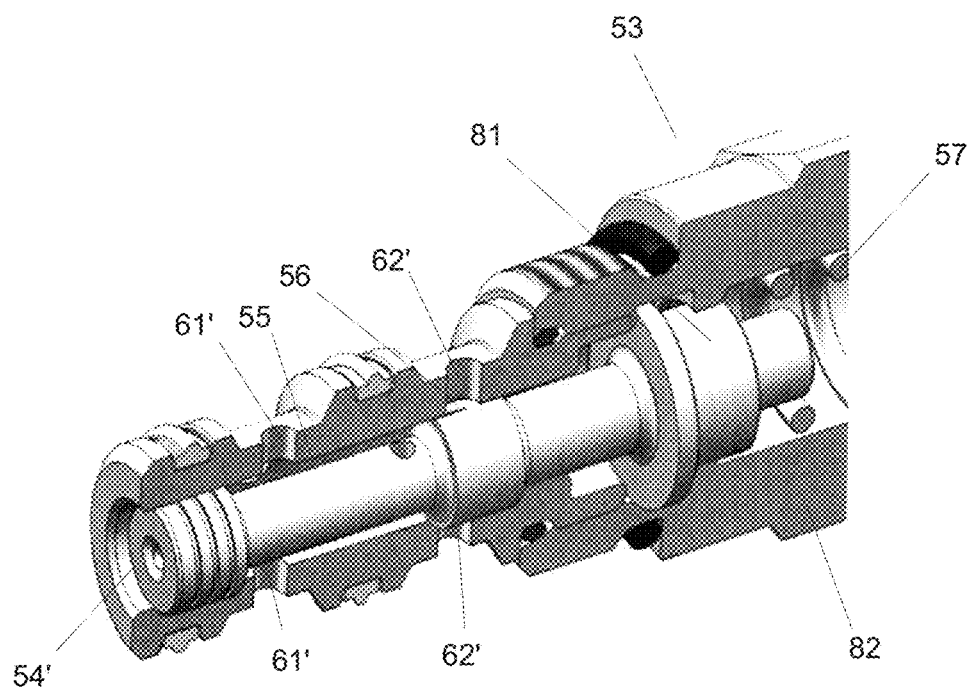
FIG. 3 shows a portion of the switchable valve in the first embodiment.

FIG. 3 shows the switchable valve 53 of FIG. 2 in a perspective view.

With the embodiment shown in FIGS. 1, 2 and 3, for example, a downshift from a second to first a gear in a two gears transmission may be considered. This transient scenario starts from the second gear, and hence the second clutch being engaged. It ends at the first gear, and hence the first clutch being engaged.

The second gear engaged corresponds to a low hydraulic pressure in the second pressure chamber 20. At the same time the first gear disengaged corresponds to a high hydraulic pressure in the first pressure chamber 10. The controllable valve 34 is in a second operating mode connecting the first hydraulic network 50 to the hydraulic pump 31 and connecting the second hydraulic network 40 to the hydraulic tank 32. The switchable valve 53 is then in a second state restricting the passage of the hydraulic fluid through the switchable valve 53 to and/or from the first pressure chamber 10.

The control unit 70 may then control the hydraulic control system 1 to perform a downshift from the second gear to the first gear, that is, the control unit 70 changes from the second operating mode to the first operating mode. In the first operating mode the control unit 70 controls the controllable valve 34 to connect the first hydraulic network 50 with the hydraulic tank 32 and connect the second hydraulic network 40 with the hydraulic pump 31.

By changing into the first operating mode, the control unit 70 initiates a transition from the engaged second gear/disengaged first gear to the disengaged second gear/engaged first gear. At the beginning of this transition the hydraulic fluid flows through the orifice 56 of the switchable valve 53 and the first restricting orifice 52 to the hydraulic tank 32. The hydraulic pressure in the first pressure chamber 10 decreases accordingly with a slow ramp determined by the restriction provided by the first restricting orifice 52 and the orifice 56 of the switchable valve 53. The hydraulic pressure in the spring chamber 85 corresponds to hydraulic pressure in the hydraulic pipe 61 which is relatively high at the beginning of the transition.

At the same time the hydraulic pressure in the second pressure chamber 20 increases since the hydraulic fluid is pumped to the second pressure chamber 20 through the second check valve 41 and, at least partially, through the second restricting orifice 42. If the hydraulic pressure in the second pressure chamber 20, which is present in the hydraulic aperture 54', exceeds a threshold corresponding to the restoring force of the spring 57 and the hydraulic pressure in the spring chamber 85, the switchable valve 53 changes into the first state wherein the spool 81 contacts the second stop 86' and wherein the switchable valve 53 does not further restrict the flow of the hydraulic fluid from the first pressure chamber 10 to the hydraulic tank 32. The hydraulic pressure in the first pressure chamber 10 decreases then much faster than before and the first clutch engages.

The restoring force of the spring 57 is adjusted such that the switchable valve 53 assumes the first state only if the hydraulic pressure in the second pressure chamber 20 is high enough such that the second clutch 23, and hence the second gear, is already disengaged. By appropriately adjusting the restoring force of the spring 57 and the hydraulic pressure produced by the hydraulic pump 31, the engagement/disengagement is performed in a mutually coordinated manner allowing for a safe operation of the hydraulic control system 1.

This way it is guaranteed that the two clutches are never engaged at the same time as long as torque is transmitted through the first and/or the second clutch 13, 23. Moreover, the dependency of the downshift on a temperature of the hydraulic fluid is reduced by reducing a dependency of the functionality of the hydraulic command system 1 on the first restricting orifice 52, the second restricting orifice 42 and the orifice 56. The effect of the clutches wear is reduced and the downshift transient is more constant over time.

The control unit 70 may control the hydraulic control system 1 to perform an upshift from the first gear to the second gear, that is, the control unit 70 changes from the first operating mode to the second operating mode. In the second operating mode the control unit 70 controls the controllable valve 34 to connect the second hydraulic network 40 with the hydraulic tank 32 and connect the first hydraulic network 50 with the hydraulic pump 31.

By changing into the second operating mode, the control unit 70 initiates a transition from the disengaged second gear/engaged first gear to the engaged second gear/disengaged first gear. The decrease of the hydraulic pressure in the second pressure chamber 20 is achieved by a flow of the hydraulic fluid from the second pressure chamber 20 to the hydraulic tank 32 via the second restricting orifice 42. The increase of the hydraulic pressure in the first pressure chamber 10 is achieved by a flow of the hydraulic fluid from the hydraulic pump 31 to the first pressure chamber 10 via the first check valve 51.

The control unit 70 may control the hydraulic control system 1 to perform a downshift from the first gear to a parking position, that is, the control unit 70 changes from the first operating mode to the third operating mode. In the third operating mode the control unit 70 controls the controllable valve 34 to connect the second hydraulic network 40 with the hydraulic tank 32 and connect the first hydraulic network 50 with the hydraulic tank 32. This control action is allowed in the case when there is no torque to be transmitted through the first clutch 13 and/or the second clutch 23.

By changing into the third operating mode, the control unit 70 initiates a transition from the disengaged second gear/engaged first gear to the engaged second gear/engaged first gear. The decrease of the hydraulic pressure in the second pressure chamber 20 is achieved by a flow of the hydraulic fluid from the second pressure chamber 20 to the hydraulic tank 32 via the second restricting orifice 42.

When changing to the third operating mode, the hydraulic pressure in the first pressure chamber 10 must decrease as quickly as possible whereas when changing from the second to the first operating mode there must be a delay in the decrease of the hydraulic pressure in the first pressure chamber 10. Therefore, the orifice 56 in the switchable valve (53) must be properly chosen as a compromise, to have a delay big enough during the change from the second to the first operating mode, but not too big to compromise the change from the first operating mode to the third operating mode.

Figure 4:
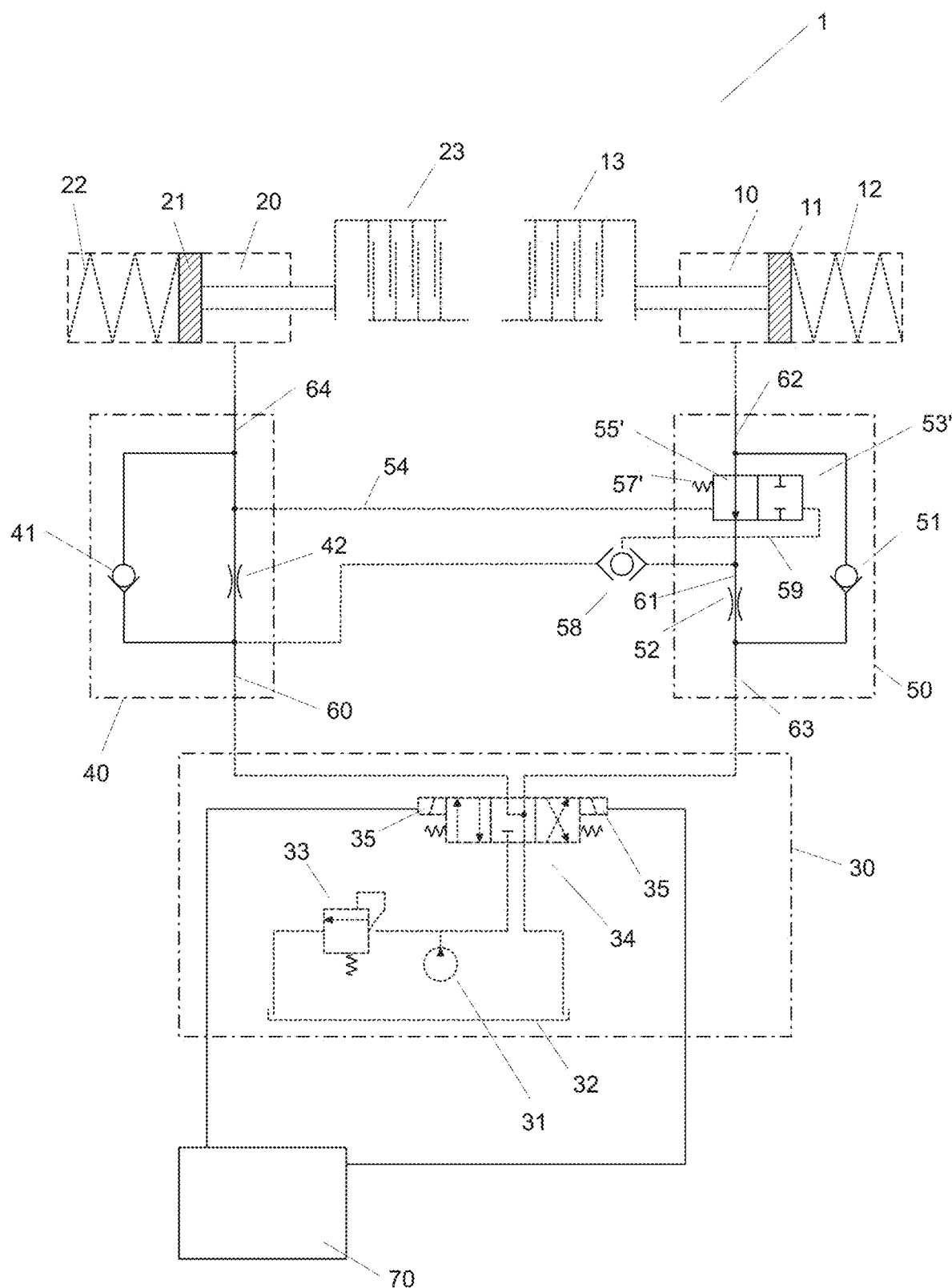
FIG. 4 shows an overview of the hydraulic control system in a second embodiment.

FIG. 4 gives an overview of the hydraulic control system 1 in a second embodiment. The hydraulic control system 1 in FIG. 4 is almost identical to the hydraulic control system 1 in FIG. 1. Therefore, only the differences are explained.

The hydraulic control system 1 in FIG. 4 comprises a shuttle valve 58. The shuttle valve 58 includes a first input, a second input and one output. The shuttle valve 58 hydraulically connects the input with the highest hydraulic pressure to the output. The first input of the shuttle valve 58 is hydraulically connected to the hydraulic pipe 61 between the switchable valve 53' and the first restricting orifice 52. The second input of the shuttle valve 58 is hydraulically connected to the hydraulic pipe 60 of the second hydraulic network 40. The output of the shuttle valve 58 is hydraulically connected to the switchable valve 53' via a hydraulic pipe 59. The state of the switchable valve 53' may hence correspond to the hydraulic pressure in the second pressure chamber 20 and the hydraulic pressure in the hydraulic pipe 59. Furthermore, the state of the switchable valve 53' may correspond to the restoration force of a spring 57' exerted on a spool 81 of the switchable valve 53'.

Figure 5:
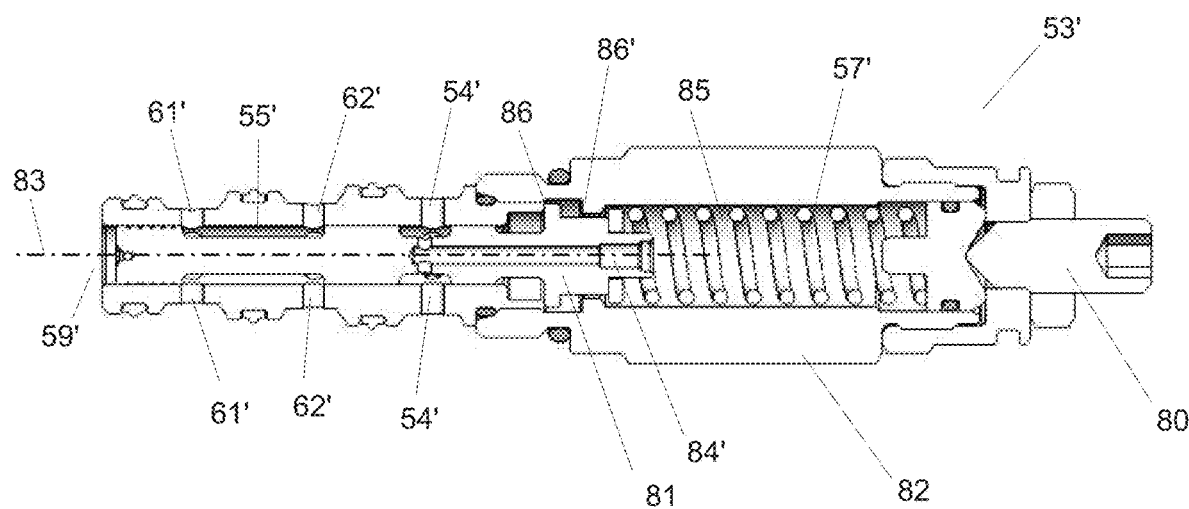
FIG. 5 shows a switchable valve in the second embodiment.

FIG. 5 shows a switchable valve 53' in a second embodiment different form the switchable valve 53 in the first embodiment. It has a structure similar to the switchable valve 53 in FIGS. 1, 2 and 3. The switchable valve 53' comprises a valve housing 82 receiving the spool 81 and the spring 57' and a setscrew 80. The spring 57' is configured to apply a restoring force on the spool 81. The setscrew 80 may be used to bias the restoring force. The switchable valve 53' has the hydraulic apertures 61', 62', 54' and 59' configured to receive the hydraulic pipes 61, 62, 54 and 59, respectively.

A bore 84' in the spool 81 connects the aperture 54' hydraulically with the spring chamber 85. The aperture 62' may be, for example, hydraulically connected to the first pressure chamber 10 and aperture 61' may be hydraulically connected to the restricting orifice 52. The aperture 54' may be connected to the second hydraulic network 40 such that the hydraulic pressure of the second hydraulic network 40, or the hydraulic pressure of the second pressure chamber 20, may be present within the aperture 54'. The aperture 59' may be connected to the hydraulic pipe 59 such that the hydraulic pressure of the hydraulic pipe 59 may be present within the aperture 59'. A force corresponding to the hydraulic pressure in the aperture 59', corresponding to the hydraulic pressure in the second pressure chamber 20 and corresponding to the restoring force of the spring 57' may then act on the spool 81. The forces determine the position of the spool 81, wherein the position of the spool 81 corresponds to a state of the switchable valve 53'. The movability of the spool 81 is limited by a first stop 86 and a second stop 86'. The switchable valve 53' may be in a first state if the spool 81 contacts the first stop 86. It may be in a second state if the spool 81 contacts the second stop 86'.

The spool 81 is designed to have different diameters along its central axis 83 such that, depending on the position of the spool 81, for example when the spool 81 contacts the first stop 86, there may be a hydraulic connection through the valve between the apertures 61' and 62' allowing for a free passage of the hydraulic fluid. It may also be, for example when the spool 81 contacts the second stop 86', that there the hydraulic connection through the valve between the apertures 61' and 62' is blocked.

Figure 6:
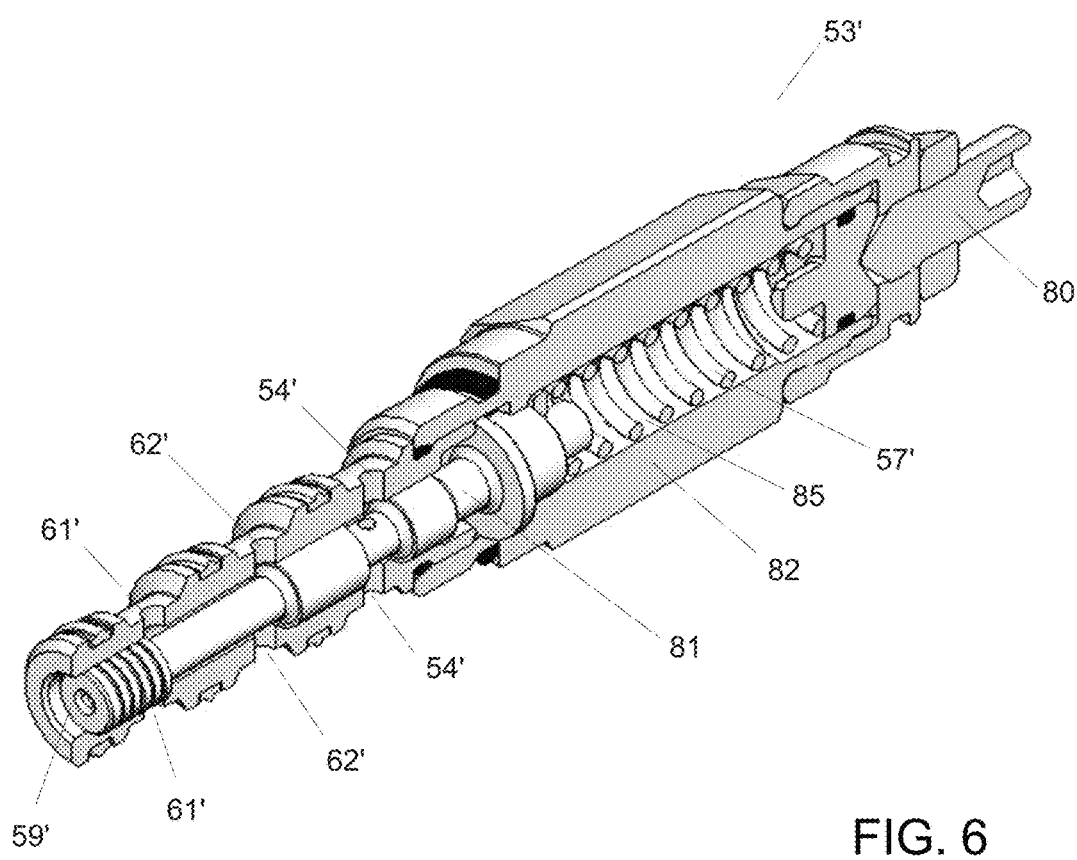
FIG. 6 shows a portion of the switchable valve in the second embodiment.

FIG. 6 shows the switchable valve 53' of FIG. 5 in a perspective view.

With the embodiment shown in FIGS. 4, 5 and 6, for example, a downshift from a second to first a gear in a two gears transmission may be considered. This transient scenario starts from the second gear, and hence the second clutch being engaged. It ends at the first gear, and hence the first clutch being engaged.

The second gear engaged corresponds to a low hydraulic pressure in the second pressure chamber 20. At the same time the first gear disengaged corresponds to a high hydraulic pressure in the first pressure chamber 10. The controllable valve 34 is in a first operating mode connecting the first hydraulic network 50 to the hydraulic pump 31 and connecting the second hydraulic network 40 to the hydraulic tank 32. The switchable valve 53' is then in a first state, that is a position where it blocks the hydraulic connection between the first pressure chamber 10 and the first restricting orifice 52.

The control unit 70 may then control the hydraulic control system 1 to perform a downshift from the second gear to the first gear, that is, the control unit 70 changes from the second operating mode to the first operating mode. In the first operating mode the control unit 70 controls the controllable valve 34 to connect the first hydraulic network 50 with the hydraulic tank 32 and connect the second hydraulic network 40 with the hydraulic pump 31.

By changing into the first operating mode, the control unit 70 initiates a transition from the engaged second gear/disengaged first gear to the disengaged second gear/engaged first gear. At the beginning of this transition there is no flow of the hydraulic fluid through the switchable valve 53'. Furthermore, the pressure in the aperture 59 is high, corresponding to the hydraulic pressure in the hydraulic pipe 61. At the same time, the hydraulic pressure in the hydraulic pipe 54 is still low such that the position of the spool 81 of the switched valve 53' substantially corresponds to the restoring force of the spring 57' and the hydraulic pressure in the hydraulic pipe 61. At this time the switched valve 53' is in the second state and the spool 81 contacts the second stop 86'.

In the sequel the hydraulic pressure in the hydraulic pipe 54 is slowly increasing and hence increasingly equalizing the force corresponding to the hydraulic pressure in the pipe 59 acting on the spool 81. As soon as the force corresponding to the hydraulic pressure in the hydraulic pipe 54 and the restoring force of the spring 57' exceeds the force corresponding to the hydraulic pressure in the hydraulic pipe 59 the switchable valve 53' may assume a first state corresponding to the spool 81 contacting the first stop 86. The hydraulic fluid may then pass the switchable valve 53' freely without restriction such that the hydraulic pressure rapidly decreases in the first pressure chamber 10 as well as in the hydraulic pipes 62, 61, 63 and 69 and the first clutch engages.

The restoring force of the spring 57' is adjusted such that the switchable valve 53' assumes the first state only if the hydraulic pressure in the second pressure chamber 20 is high enough such that the second clutch 23, and hence the second gear, is already disengaged. By appropriately adjusting the restoring force of the spring 57' and the hydraulic pressure produced by the hydraulic pump 31, the engagement/disengagement is performed in a mutually coordinated manner allowing for a safe operation of the hydraulic control system 1.

This way it is guaranteed that the two clutches are never engaged at the same time as long as torque is transmitted through the first and/or the second clutch 13, 23. Moreover, the dependency of the downshift on a temperature of the hydraulic fluid is reduced by reducing a dependency of the functionality of the hydraulic command system 1 on the first restricting orifice 52 and the second restricting orifice 42. The effect of the clutches wear is reduced and the downshift transient is more constant over time.

FIGS. 1-6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A hydraulic control system, comprising:
a first pressure chamber and a second pressure chamber, each pressure chamber configured to receive a hydraulic fluid;
a first movable member configured to assume a position depending on a hydraulic pressure of the hydraulic fluid in the first pressure chamber and a second movable member configured to assume a position depending on a hydraulic pressure of the hydraulic fluid in the second pressure chamber;
a hydraulic command circuit configured to provide the hydraulic fluid and to control the hydraulic pressure of the hydraulic fluid in at least one of the first pressure chamber and the second pressure chamber; and
a switchable valve in fluid communication with the first pressure chamber, wherein the switchable valve is configured to be pilotable depending on the hydraulic pressure of the hydraulic fluid in the second pressure chamber;
wherein the hydraulic command circuit comprises:
a hydraulic tank configured to store the hydraulic fluid;
a hydraulic pump configured to pump the hydraulic fluid and to create the hydraulic pressure; and
a controllable valve configured to block and/or allow a passage of the hydraulic fluid and be in a fluid communication with at least one of the hydraulic tank, the hydraulic pump, the first pressure chamber, and the second pressure chamber.

2. The hydraulic control system according to claim 1, further comprising a first clutch and a second clutch, wherein the first movable member is connected to the first clutch and configured to engage and/or disengage the first clutch, and wherein the second movable member is connected to the second clutch and configured to engage and/or disengage the second clutch.

3. The hydraulic control system according to claim 1, further comprising a first hydraulic network configured to provide a fluid communication between the first pressure chamber and the hydraulic command circuit, the first hydraulic network comprising a first restricting orifice and the switchable valve connected in series and a first check valve connected in parallel to the first restricting orifice and the switchable valve.

4. The hydraulic control system according to claim 3, further comprising a second hydraulic network configured to provide a fluid communication between the second pressure chamber and the hydraulic command circuit, the second hydraulic network comprising a parallel circuit of a second check valve and a second restricting orifice.

5. The hydraulic control system according to claim 4, wherein the switchable valve is further configured to:
in a first state, allow a passage of the hydraulic fluid through the switchable valve to and/or from the first pressure chamber; and
in a second state, restrict, for instance by means of at least one of an orifice and a notch, the passage of the hydraulic fluid through the switchable valve to and/or from the first pressure chamber or to block the passage of the hydraulic fluid through the switchable valve.

6. The hydraulic control system according to claim 5, wherein the switchable valve is configured to be in the first state when the hydraulic pressure in the second pressure chamber is substantially greater than or equal to a threshold.

7. The hydraulic control system according to claim 6, wherein the switchable valve comprises a spool and a spring configured to apply a force to the spool and wherein the threshold corresponds to a magnitude of the force applied to the spool.

8. The hydraulic control system according to claim 6, wherein the threshold corresponds to either the hydraulic pressure in the first hydraulic network or in the second hydraulic network, whichever pressure is the highest.

9. The hydraulic control system according to claim 8, further comprising a shuttle valve in a fluid communication with the first hydraulic network and the second hydraulic network and the switchable valve, wherein the shuttle valve is configured to provide the hydraulic fluid to the switchable valve having the hydraulic pressure corresponding to either the hydraulic pressure in the first hydraulic network or in the second hydraulic network, whichever pressure is the highest.

10. The hydraulic control system according to claim 9, further comprising: a first connecting hydraulic pipe connecting the switchable valve and the first restricting orifice; and a second connecting hydraulic pipe connecting the second restricting orifice and the hydraulic command circuit, wherein the shuttle valve is in a fluid communication with the first connecting hydraulic pipe and the second connecting hydraulic pipe.

11. The hydraulic control system according to claim 1, further comprising a control unit configured to control a passage of the hydraulic fluid through the controllable valve.

12. A method for controlling the hydraulic control system according to claim 11, wherein the control unit controls the passage of the hydraulic fluid through the controllable valve, and wherein the method comprises a first operating mode to:
  allow a passage of at least one of the hydraulic fluid and a propagation of the hydraulic pressure between the hydraulic pump and the second pressure chamber through the controllable valve; and
  allow passage of the hydraulic fluid between the first pressure chamber and the hydraulic tank through the controllable valve,
  such that the first clutch is engaged and the second clutch is disengaged, and wherein the method comprises a second operating mode to:
    allow a passage of at least one of the hydraulic fluid and a propagation of a hydraulic pressure between the hydraulic pump and the first pressure chamber through the controllable valve; and
    allow passage of the hydraulic fluid between the second pressure chamber and the hydraulic tank through the controllable valve,
  such that the first clutch is disengaged and the second clutch is engaged, and wherein the method further comprises a third operating mode to:
    allow passage of the hydraulic fluid between the first pressure chamber and the hydraulic tank through the controllable valve and between the second pressure chamber and the hydraulic tank through the controllable valve such that the first clutch is engaged and the second clutch is engaged.

13. The method according to claim 12,
  wherein, in the first operating mode, the switchable valve allows a free passage of the hydraulic fluid through the switchable valve to and/or from the first pressure chamber;
  wherein, in the second operating mode, the switchable valve restricts passage of the hydraulic fluid through the switchable valve to and/or from the first pressure chamber or blocks the passage of the hydraulic fluid through the switchable valve; and
  wherein, in the third operating mode, the switchable valve restricts passage of the hydraulic fluid through the switchable valve to and/or from the first pressure chamber or allows the free passage of the hydraulic fluid through the switchable valve.

14. The method according to claim 13, wherein the first hydraulic network and the second hydraulic network and the hydraulic command circuit are adjusted to allow the free passage of the hydraulic fluid through the switchable valve to and/or from the first pressure chamber if the hydraulic pressure in the second pressure chamber is equal or larger than 60 percent of a predetermined maximum value.

15. The method according to claim 13, wherein the first hydraulic network and the second hydraulic network and the hydraulic command circuit are adjusted to allow the free passage of the hydraulic fluid through the switchable valve to and/or from the first pressure chamber if the hydraulic pressure in the second pressure chamber is equal or larger than 70 percent of a predetermined maximum value.

16. The method according to claim 13, wherein the first hydraulic network and the second hydraulic network and the hydraulic command circuit are adjusted to allow the free passage of the hydraulic fluid through the switchable valve to and/or from the first pressure chamber if the hydraulic pressure in the second pressure chamber is equal or larger than 80 percent of a predetermined maximum value.

17. The method according to claim 13, wherein the first hydraulic network and the second hydraulic network and the hydraulic command circuit are adjusted to allow the free passage of the hydraulic fluid through the switchable valve to and/or from the first pressure chamber if the hydraulic pressure in the second pressure chamber is equal or larger than 90 percent of a predetermined maximum value.

18. The method according to claim 13, wherein, in the second operating mode, the switchable valve uses at least one of an orifice and a notch to restrict the passage of the hydraulic fluid through the switchable valve to and/or from the first pressure chamber.

19. The method according to claim 13, wherein, in the third operating mode, the switchable valve uses at least one of an orifice and a notch to restrict the passage of the hydraulic fluid through the switchable valve to and/or from the first pressure chamber.

* * * * *